Nov. 14, 1939.    O. E. ANDRUS    2,179,476
HOT WATER TANK AND CONNECTION
Filed Aug. 31, 1938
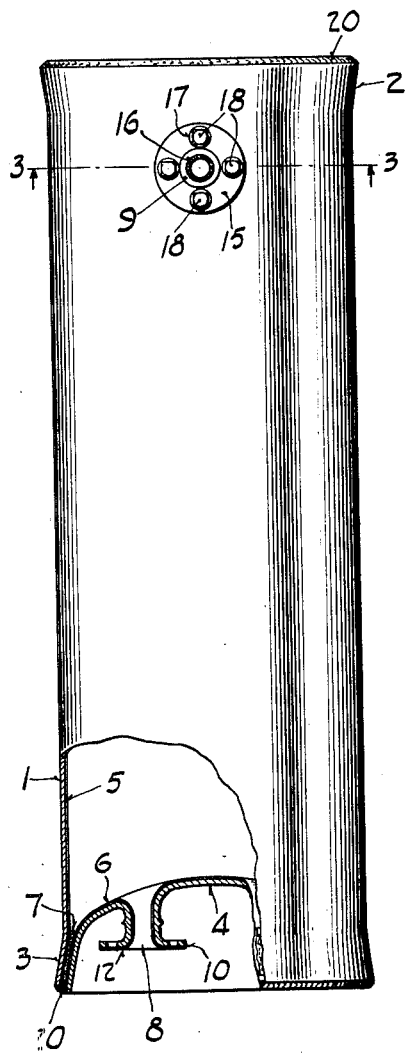
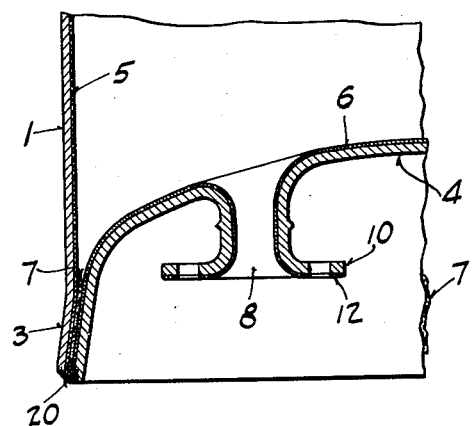
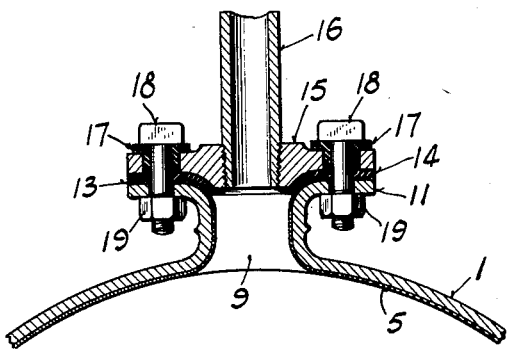
Orrin E. Andrus
INVENTOR.
BY *Orrin E. Andrus*
ATTORNEY.

Patented Nov. 14, 1939

2,179,476

UNITED STATES PATENT OFFICE 2,179,476

HOT WATER TANK AND CONNECTION

Orrin E. Andrus, Altadena, Calif., assignor to A. O. Smith Corporation, Milwaukee, Wis., a corporation of New York Application August 31, 1938, Serial No. 227,620

1 Claim. (Cl. 285—17)

This invention relates to hot water tanks and their connections and more particularly to connections to be built into tanks for use in domestic service in the heating and storage of hot water where the tanks are protected with vitreous enamel inner coatings, although various features of the invention are applicable to the construction of tanks with various linings and for other purposes.

Heretofore in the manufacture of tanks with protective liners for the heating and storage of hot water, considerable difficulty has been experienced in producing a satisfactory attachment to the tank for the connection of the piping of the water system.

Most of the commercial hot water tanks today are made from either steel galvanized on the inside, from Everdure or Monel metal or other similar alloy, or from a combination of steel and corrosion resistant metal lining known as cladding. The former are the cheapest but are generally very short lived. The Everdure or Monel tanks are in themselves relatively permanent but are very expensive. The clad tanks are cheaper than the solid alloy tanks but have given trouble due largely to difficulties in making the assembly and connections thereto.

Difficulties that arise in the use of the clad tanks as distinguished from the solid alloy tanks arise from imperfect linings. In the assembly of a tank made from a body section and head sections composed of clad materials the joinders are usually made by welding. Difficulties have arisen due to the burning away of the thin alloy inner liner and thereby exposing the steel to the corrosive action of the water. The presence of dissimilar metals in the liquid, namely, the steel and the alloy have set up electrolytic corrosion causing the steel to be consumed very rapidly. Similar difficulties have been experienced in the welding-in of connections to these clad tanks for the attaching of piping thereto.

Solid alloy tanks such as Monel and Everdure have withstood corrosion very well but when iron piping or other piping of metal dissimilar to that of the tank have been connected thereto the piping has corroded rapidly necessitating its renewal.

In galvanized iron tanks due to the difficulty of obtaining a perfect coating in an enclosed container the galvanizing has frequently been broken or consumed over areas of their surfaces. When the exposed areas of steel have become large they have been subject to corrosion some of which is believed to be electrolytic, occurring between the iron and elements such as copper heating coils connected to and located closely adjacent to such tank.

This application does not claim the detailed constructional features illustrated herein which are also disclosed and claimed in applications Serial Numbers 215,650 and 215,651 to Otto E. Uecker, filed June 24, 1938, and assigned to the assignee of the of the present application.

The principal object of the present invention is to provide in a hot water tank a construction which will eliminate the effects of electrolytic corrosion and produce a structure with assured long life.

Another object of the invention is to provide a steel hot water tank which is lined with materials that do not set up electrolytic action with the steel and which tank is insulated against the flow of electrolytic currents to other objects exterior thereto.

Another object is to provide a low cost hot water tank free from electrolytic action tending to cause deterioration thereof.

Another object is to provide a hot water tank protected against corrosion by vitreous enamel and separated from outside piping against electrolytic attack.

Other objects will appear hereinafter in connection with the description of the preferred embodiments and modifications thereof.

The invention is illustrated in the drawing in which:

Figure 1 is a side view of a hot water tank with a portion broken away to show a partial longitudinal section therethrough;

Fig. 2 is an enlarged view of the section shown in Fig. 1; and

Fig. 3 is a partial section taken on the line 3—3 of Figure 1.

Referring to the drawing, 1 is a cylindrical shell of a hot water tank with slightly flared out ends 2 and 3 to receive heads of which 4 is one. A vitreous enamel inner protective coating 5 is shown on shell 1 and a similar enamel coating 6 on head 4. A compressible strip of material 7, such as asbestos, is shown between the head 4 and the flared portion 3 of shell 1.

A flanged opening 8 is provided for making connection to head 4, and a flanged opening and connection 9 is provided in the shell 1. Other similar connections but not shown are contemplated. The enamel coatings of the shell and heads are provided, without breaks therein, extending through the openings and extending over the outer faces of the flanges 10 and 11 in the head and shell respectively at 12 and 13.

Associated with the flange of the opening is an insulated connection shown in Fig. 3 and consisting of a fiber or other similar gasket 14, a connection plate 15, pipe 16, insulating bushings 17, bolts 18 and nuts 19. Pipe 16 is thus effectively insulated from shell 1.

In the manufacture the shell portion is first formed into cylindrical form from a sheet of steel and the longitudinal edges joined by suitable welding means in abutting relation to present a smooth interior surface suitable for enameling. The end portions are then flanged out by pressing or other suitable means. Heads are then constructed for assembly in the shell ends. The individual shell and head pieces are then provided with the fused enamel protective coatings.

The lined heads are assembled into the shell ends under pressure with the pliable strips positioned between the heads and shell and tightly compressed therebetween after which a weld 20 is applied to join the head and shell.

In the structure described a vitreous enamel coating is provided throughout the interior of the tank to protect it against corrosive action. The parts of the assembly are each separately available for careful inspection after enameling thus insuring a high degree of perfection of such coatings. It has been found that generally if any minute flaw in the enamel, such as a small pin hole, should exist in the final product such small flow will intrap such products of corrosion as may be formed due to general corrosive attack and effectively inhibit any further attack and thereby preserve the permanency of the protection. If any such small exposure should occur in the well confined space adjacent to the weld 20 this same healing condition is thoroughly effective.

In a hot water tank in which metal of the inside of the tank is or may be exposed to the hot water, the interior metal should all be alike or it should be such throughout that no appreciable differences of electrolytic electromotive forces are set up between its component parts. The insulation of the tank from the piping and other connection members in which dissimilar metals may be included arrests the passage of corrosive electrolytic currents.

The occurrence of electrolytic corrosion, due to the presence of metals dissimilar to steel and of such an electromotive relation to steel as to be displaced by steel in such action, is more serious than is the case with general corrosion. The construction of the present tank has been such as to eliminate any such dissimilar metals from incorporation in the tank; the insulating connections between the tank and outside piping with its connected apparatus exposed to the hot water or common liquid prevent the circulation of electrolytic currents to the tank. Tanks of the above construction have proven to be highly satisfactory and provide excellent protection against corrosive attack and insure also that the water will be maintained pure and unaffected by pollution from products of corrosion.

The invention is claimed as follows:

A hot water tank, an electrically non-conductive corrosion protective liner therefor, openings in said tank to connect the tank with metallic water piping of metal having a different electromotive force value than the metal of the tank when connected therewith in a galvanic circuit, and electrically insulating connections at said openings between the tank and piping, the insulation being of a material serving to prevent the flow of electrolytic currents between the piping system and any metal exposed through said liner.

ORRIN E. ANDRUS.